United States Patent [19]

Appriou et al.

[11] Patent Number: 5,208,757
[45] Date of Patent: May 4, 1993

[54] AIRBORNE SYSTEM FOR DETERMINING THE POSITION OF AN AERIAL VEHICLE AND ITS APPLICATIONS

[75] Inventors: Alain Appriou, Saclay; Jean Dezert, Malakoff; Joseph Bensimon, L'Hay-les-Roses, all of France

[73] Assignee: Societe Anonyme dite: Aerospatiale Societe Nationale Industrielle, Paris, France

[21] Appl. No.: 639,987

[22] Filed: Jan. 11, 1991

[30] Foreign Application Priority Data

Jan. 12, 1990 [FR] France .................................. 90 0031

[51] Int. Cl.$^5$ .......................................... G06F 15/50
[52] U.S. Cl. .................................. 364/456; 364/449; 342/64
[58] Field of Search ............... 364/443, 456, 458, 449; 342/64

[56] References Cited

U.S. PATENT DOCUMENTS

| | | | |
|---|---|---|---|
| 4,533,918 | 8/1985 | Virnot | 343/451 |
| 4,584,646 | 8/1986 | Chan et al. | 364/449 |
| 4,602,336 | 7/1986 | Brown | 364/456 |
| 4,700,307 | 10/1987 | Mons et al. | 364/453 |
| 4,829,304 | 5/1989 | Baird | 342/63 |
| 4,891,762 | 1/1990 | Chotiros | 364/456 |
| 4,939,663 | 7/1990 | Baird | 364/449 |
| 4,951,213 | 8/1990 | Baxter et al. | 364/456 |
| 5,047,777 | 9/1991 | Metzdorff et al. | 342/64 |
| 5,086,396 | 2/1992 | Waruszewski, Jr. | 364/454 |

FOREIGN PATENT DOCUMENTS 2060306 4/1981 United Kingdom .
2144007 2/1985 United Kingdom .

OTHER PUBLICATIONS

IEEE Position Location and Navigation Symposium Record, Nov. 29, 1988, Kissemmee, Fla., pp. 297–302; Tang et al., "Precision Trajectory Reconstruction."

Primary Examiner—Thomas G. Black
Attorney, Agent, or Firm—Marshall, O'Toole, Gerstein, Murray & Bicknell

[57] ABSTRACT

An airborne system is disclosed for determining the position of an aerial vehicle. According to the invention, a first memory is provided containing the general characteristics of different types of discrete landmarks and a second memory containing the geographic position of such landmarks on the ground to be flown over, a device for extracting, from the signals delivered by sensitive means, the general characteristics of said different types of discrete landmarks located on the ground being flown over, and a device for computing from the signals delivered by said sensitive means the relative positions of said vehicle with respect to said recognized landmarks, which it feeds to Kalman filter means.

8 Claims, 3 Drawing Sheets

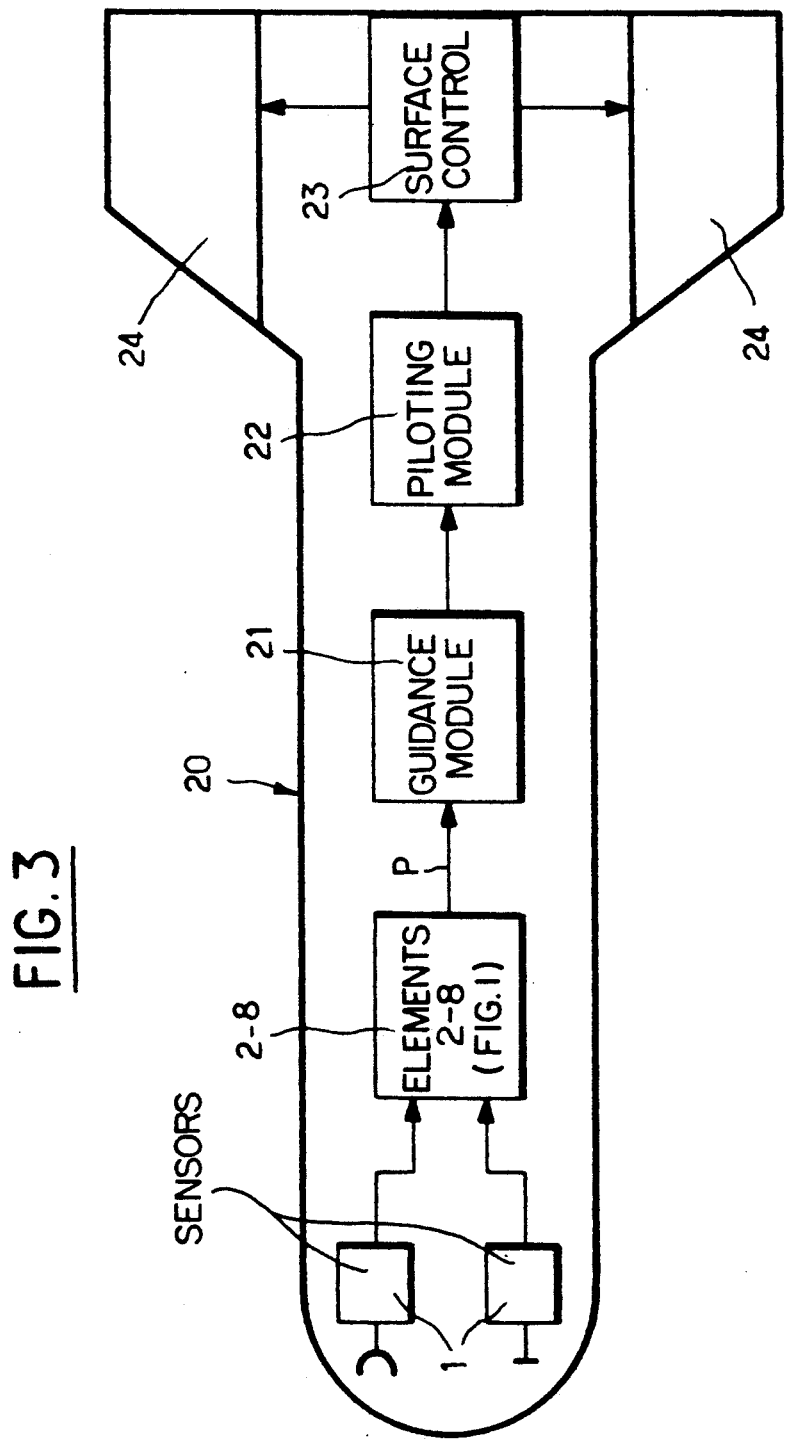

AIRBORNE SYSTEM FOR DETERMINING THE POSITION OF AN AERIAL VEHICLE AND ITS APPLICATIONS

BACKGROUND OF THE INVENTION

The present invention relates to an airborne system for determining the position of an aerial vehicle, which may be used not only for automatically guiding said vehicle (particularly but not exclusively in the case of a pilotless vehicle) but also for assisting the pilot of a piloted vehicle.

Inertial navigating systems are known using an inertial unit which have the advantages of independence with respect to the environment and discretion, which is particularly appreciable for military missiles intended to penetrate into enemy territory. In these inertial navigating systems, the present position of the vehicle is determined by up-dating a previous position by integration of accelerometric and gyrometric measurements. Thus, they are subject to drifts which must be compensated for so that the present position of the vehicle may be known with sufficient accuracy.

In addition, in such inertial navigating systems, periodic position measurements are made by means of appropriate sensors, for correcting the results from the integration of said accelerometric and gyrometric measurements.

Particularly, when the flight of said vehicle must be independent and discreet, it is advantageous for such periodic resetting measurements to result from correlation between the present image of the ground being flown over delivered by an airborne sensor and a reference image of the ground to be flown over, this reference image being established prior to the flight and stored in a memory provided on board said aerial vehicle. To form the present image and/or the reference image of the ground, it is possible as is known to use numerous types of sensors, such as the altimeter (the image is then formed by the relief of the ground), millimetric radar, millimetric radiometry, infrared or optical imagery systems or else the laser.

Thus, in these known systems, a correlation function is formed between an image taken over a large ground area (the present image) and a similar image learned previously and available in the on-board memory (the reference image), which assumes learning by the machine of the whole of the ground to be flown over for the magnitude used by the sensor.

The result of the correlation between said present image and said reference image forms then a position error signal which, by way of unique innovation may be applied to a Kalman filter integrating the inertial measurements. Thus, periodically, said filter is reset for delivering a precise present position, from which the drifts are eliminated.

Known inertial navigating systems of this type have however drawbacks.

First of all, because of their very structure comprising a Kalman filter, they are adapted to use the present image of only a single sensor; thus, they cannot pertinently take into account several present images coming from as many different sensors, which would however increase the accuracy of the present position by judicious use of the complementarity of certain sensors. In addition, they require the reference image to comprise all the information equivalent to that which said sensor is able to give for the present image, i.e. it is necessary to learn the whole of the ground to be flown over for the magnitude measured by the sensor and for all the observation conditions. Such learning is difficult, if not impossible to acquire in a sufficiently reliable way; in any case, it is tricky and long to work out. The result is moreover that such known systems require on board the vehicle computing means and high capacity memories. Furthermore, the flexibility in use of such known systems is low in so far as the planning or modification of a flight is concerned, since it is dependent on the knowledge and storage of the image of the ground to be flown over.

SUMMARY OF THE INVENTION

The object of the present invention is to overcome such drawbacks. For this, in accordance with the invention, the airborne system for determining the position of an aerial vehicle, of the type comprising sensitive means scanning the ground flown over, Kalman filter means, storage means containing the map of the ground to be flown over, means for comparison between the information delivered by said sensitive means and information from said storage means, as well as computing means delivering a unique innovation for said Kalman filter means, is remarkable in that :

said storage means comprise a first memory containing the general characteristics of different types of discrete landmarks and a second memory containing the geographical position of such particular landmarks on the territory to be flown over;

said system further comprises :

a device for extracting, from the signals delivered by said sensitive means, said general characteristics of said different types of discrete landmarks located on the territory being flown over; and a device for computing, from the signals delivered by said sensitive means, the relative positions of said vehicle with respect to said recognized landmarks, which it sends to said Kalman filter means;

and said comparison means comprise a first comparison device comparing the information from said extraction device with that contained in said first memory, as well as a second comparison device comparing the information from said first comparison device with that contained in said second memory.

Thus, the system in accordance with the present invention allows the position of said aerial vehicle to be determined solely from discrete landmarks and not, as in the prior technique, from the whole of the elements of a The result is saving in computing and storage capacity. In addition, the reference maps are easier and simpler to produce.

According to another aspect of the present invention said discrete landmarks are processed one by one and not as a whole. For this, it is advantageous for said computing means to compute, for the information from said first comparison device, the probability for each landmark recognized by said sensitive means to belong to each of said types of landmarks, for said second memory to comprise for each landmark described by its geographical position the probability that said landmark has of being each of said types of landmarks and for said second comparison device to compare, for each of the landmarks contained in said second memory, the probabilities of being each of said types of landmarks with the similar probabilities delivered by said first comparison device for a landmark recognized by said sensitive means.

Preferably, said sensitive means comprise a plurality of different sensors. Thus, it is possible to take advantage of the complementarity of said sensors.

Advantageously, said second comparison device infers said probabilities following rules drawn up from Dempster and Shafer's theory of evidence, whereas determination of the unique innovation by said computing means is implemented by Bar Shalom's PDAF technique.

In a preferred embodiment, the system according to the invention comprises:

a first computing unit, connected to said device computing the relative positions of the vehicle with respect to the recognized landmarks and to the Kalman filter properly speaking, estimating the absolute position of an observed landmark, as well as a covariance matrix of the innovation regarding the position of the observed landmark;

a second computing unit connected to said second memory and to said first computing unit, providing statistical fenestration of the landmarks of said second memory;

a third computing unit, connected to said second computing unit, determining the probability of associating the detected landmark with the landmarks of said second memory, according to the PDAF technique;

a fourth computing unit, connected to the first comparison device, putting into practice the rules of inference of the theory of evidence for synthesizing the information available concerning the identity of the observed landmarks;

a fifth computing unit, connected to the second and fourth computing units, establishing the masses to be attributed to the different possible sets of hypotheses of association of the observed landmark with the landmarks of the second memory selected by the second computing unit;

a sixth computing unit, connected to said third and fifth computing unit, merging the masses of probabilities attributed to the hypotheses of associating the detected landmark with the different landmarks of the second memory by said third computing unit with the masses attributed to all the possible sets of hypotheses by said fifth computing unit;

a seventh computing unit, connected to said sixth computing unit and evaluating the innovation of the Kalman filter using the PDAF technique; and an eighth computing unit, connected to said seventh computing unit and supplying the gain to the Kalman filter and up-dating thereof.

The system of the present invention may be used in a navigational aid system or else in an automatic guidance system. In the first case, a display device is provided on which are displayed the output signals of the Kalman filter; in the second, devices are adapted for using the output signals of the Kalman filter for acting on the steering control members of said vehicle.

BRIEF DESCRIPTION OF THE DRAWINGS

The figures of the accompanying drawings will better show how the invention may be put into practice. In these figures, identical references designate similar elements.

FIG. 3 illustrates the application of the system of the present invention to the automatic guidance of a missile.

DESCRIPTION OF THE PREFERRED EMBODIMENTS

Figure 1:
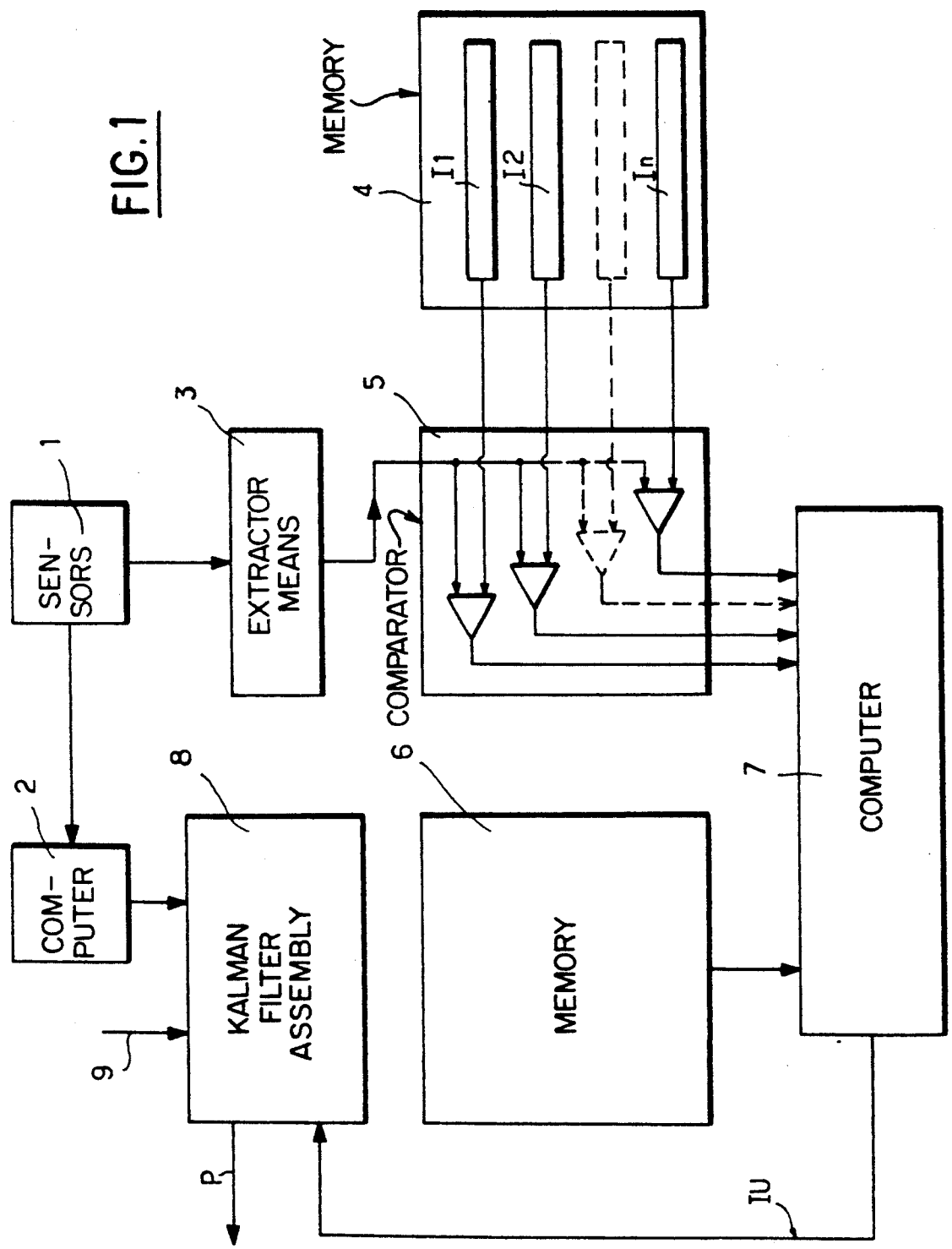
FIG. 1 is a block diagram of the general system according to the present invention.

The system according to the invention, shown schematically in FIG. 1, is intended to be carried on board an aerial vehicle (not shown). It comprises a set of sensors 1, computing means 2 receiving the signals from said set of sensors 1 and delivering the position of said aerial vehicle with respect to landmarks detected by said assembly 1, means 3 for extracting the characteristics of said detected landmarks, a first memory 4 containing the general characteristics of particular landmarks, a comparison device 5 receiving the output signals from the extraction means 3 and from said first memory 4, a second memory 6 containing the positions of said particular landmarks likely to be met with on the ground flown over by said aerial vehicle, computing means 7 and a Kalman filter assembly 8.

Contrary to the known image correlation systems described above, the system of the present invention does not process, at a given moment, the image of the whole of a ground area, but a small local image, for recognizing particular landmarks. Use of the system assumes the previous selection of some types of landmark Ii (with $i=1, 2, \ldots, n$) which can be used, (for example road junctions, bridges, constructions, ...), determination of characteristics of the image likely to discriminate each type as a whole, independently of the conditions of observation (accumulation by Hough's transform, moments of the segmented object, particular points of the bidimensional FFT,...) and statistical characterization of the measurement of the characteristics for the whole of the landmarks of the same type (distribution model and possible errors of these models with respect to the observed measurements).

Thus, in the device of FIG. 1, from the images observed by the set of sensors 1, the characteristics are determined using means 3 which correspond to those selected for the different types of pre-selected landmarks. The characteristics obtained at the output of means 3 are then compared in device 5 with similar characteristics available in the first memory 4, for each type Ii pre-selected. The statistical distribution models of these measurements of characteristics then allow the computing means 7 to evaluate the probability of facing a landmark of each of the indexed types Ii. Knowledge of the possible statistical model errors may in addition allow this probability to be defined in an uncertain way, i.e. for example by a range of possible probabilities $\Delta$(Ii).

In the second memory 6, a map is moreover available of the landmarks belonging to one or other of the indexed types Ii, for the navigational zone envisaged. This map is in fact a simple list of the landmarks concerned, in which each of them is described by its geographical position and the probability, possibly uncertain $\Delta$(Ii), that it has of being each of the indexed types Ii. Very often, the type of each landmark is well known: a probability $1(\Delta=\{1,1\})$ is then assigned to this type and a probability $0(\Delta=\{0, 0\})$ is assigned to the others. The system is in fact presented here so as to leave the latitude of using landmarks which are uncertain by the information we have about them, for example because of the ageing of the information, of an inappropriate analysis means, or poor quality, etc...

For each of the landmarks indexed in said second memory 6 and being then in the field of uncertainty of navigation, the probabilities that it is each of the indexed types Ii are compared in computing means 7 with the similar probabilities delivered by device 5 for the observed landmark by the above described processing, for the different sensors forming assembly 1. The inference of these uncertain probabilities is preferably provided by the computing means 7 using rules drawn up from the Dempster and Shafer's theory of evidence, such as defined in the following documents :

1. Dempster Arthur P.
1967 "Upper and lower probabilities induced by multivalued mapping", Annals of Mathematical Statistics, 38, pp 325-339.
2. Dempster Arthur P.
1968 "A generalization of Bayesian inference", Journal of the Royal Statistical Society, Series B, 30.
3. Shafer Glenn
1976 "A Mathematical Theory of Evidence", Princeton University Press, Princeton, N.J.

In addition, the inference of of such uncertain probabilities takes advantageously into account the "certain" probability that each of the landmarks indexed in the second memory 6 has of being the detected landmark, considering its position and the statistical characteristics of the position estimation delivered by the prediction filter of device 8. The result of this operation provides an overall "certain" probability that each of the landmarks located in the field of uncertainty of navigation has of being the detected landmark.

The unique innovation IU delivered by the computing means 7 to the standard Kalman filter assembly 8 results then from averaging the position errors which would be obtained if the detected landmark were associated successively with the different landmarks of the map of the second memory 6 taken into consideration, each of these errors being weighted by the probability associated with the corresponding landmark. This operation, as well as evaluation from the prediction filter of the probability of associating each landmark with the detected landmark, such as presented above, are advantageously implemented by the PDAF technique (Probabilistic Data Association Filter) of Bar Shalom, which is quite compatible with the available information and the problems raised and which is for example explained in the following work :

4. Y. Bar Shalom, T. Fortmann Tracking and Data Association Academic Press 1988

It will be noted that the PDAF technique is usually used for tracking targets, when their detection takes place in an ambience with a high false alarm rate; it then allows the false echos and defects of detection to be appropriately controlled. In the present application, the ambiguities regarding identity and location of the landmarks may be compared with such false echos of the position measurement of the detected landmark, i.e. of the position of the aerial vehicle when the relative position measurement between the vehicle and the detected landmark is taken into account, delivered by the computing means 2 to assembly 8. If required, additional position information may be supplied (at 9) to assembly 8 by an inertial unit (not shown).

It will be further noted that machine learning of the landmarks must take into account the hypotheses that the detected landmark is of unknown type.

The information worked out by the Kalman filter of assembly 8 relatively to the state of navigation (position and speed of the vehicle, particularly) is then available at the output of said assembly for a vehicle guidance module, or for a display, depending on the application envisaged.

The foregoing shows that it is possible to use a plurality of sensors, represented as a whole by square 1. These sensors may be of the above recalled known types and their choice, number and performances are not critical. They are in practice chosen on the basis of their good complementarity and compatibility within the scope of the application envisaged.

Figure 2:
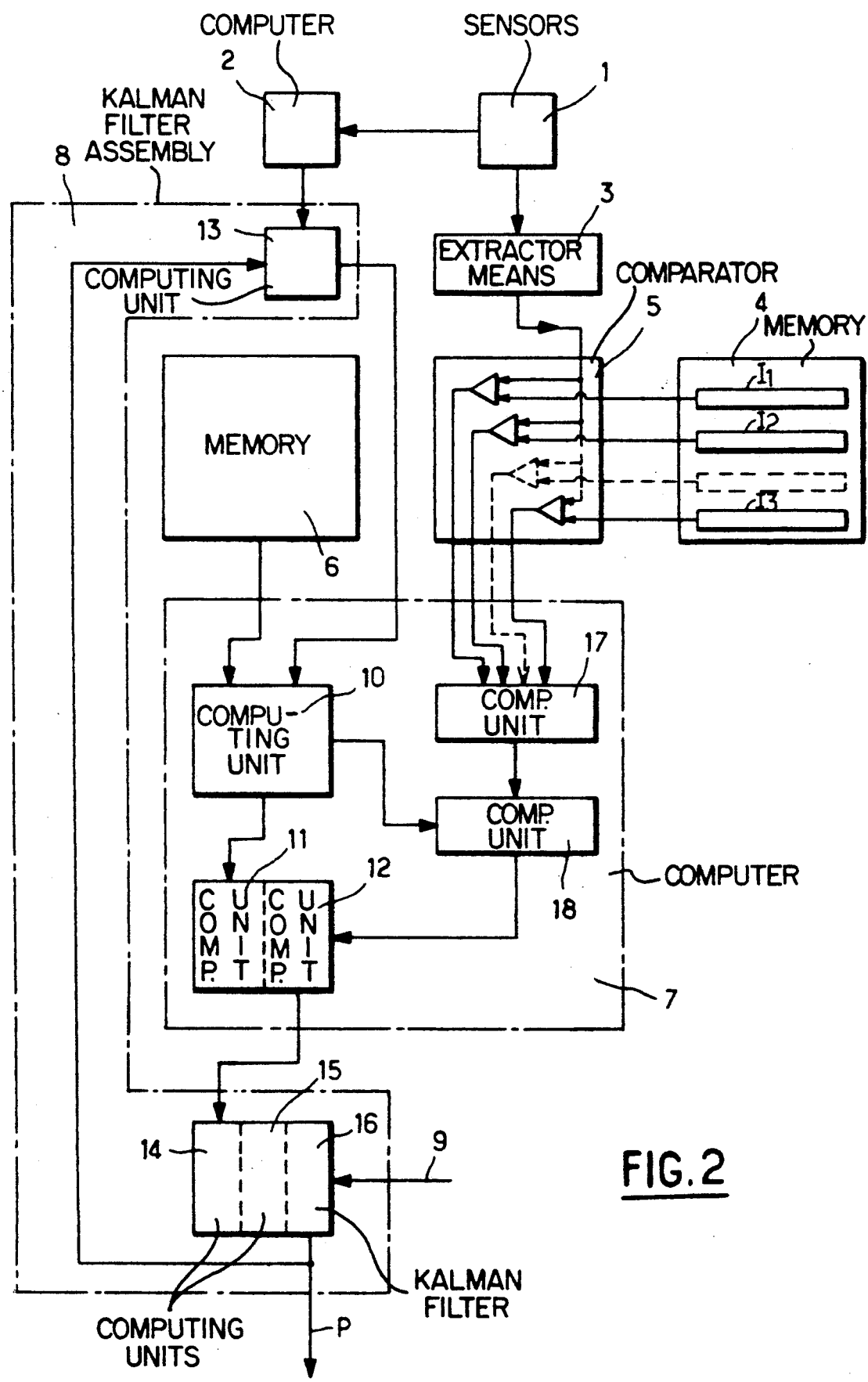
FIG. 2 is a block diagram of a preferred embodiment of the system of FIG. 1.

In FIG. 2, a practical embodiment of a system according to the invention has been shown in the form of a block diagram. In this FIG. 2 we find the elements 1 to 9 of the system of FIG. 1; in addition, it can be seen that the computing means 7 are formed of several computing units 10, 11, 12, 17 and 18, while assembly 8 comprises several computing units 13, 14 and 15, as well as the Kalman filter 16, properly speaking. These different elements 1 to 18 are connected functionally in the following way.

The computing means 2 provide a relative position measurement vector z of the landmark detected by sensors 1 with respect to the vehicle. The position measurements extracted from the different sensors 1 feed the different successive components of this vector. The computing means 2 also work out the matrix of covariance R of the measurement noise of vector z (in practice R=f(z), where f is specific to the sensors).

The computing unit 13, connected to the computing means 2 and to the Kalman filter 16, makes it possible to estimate the absolute position ($\hat{A}$) of the observed landmark, from the estimated position y of the vehicle delivered by said filter 16.

$$A = y + z \qquad (1)$$

as well as the covariance matrix S of the innovation respecting the position of the observed landmark, from the predicted covariance matrix P concerning the estimation error of the state (filter 16), and knowing the observation matrix H of the system :

$$S = H P H^T + R \qquad (2)$$

The computing unit 10, connected to memory 6 and to computing unit 13, provides a statistical fenestration of the landmarks referenced at $A_k$ in the navigation map (memory 6), i.e. a first selection of the landmarks a priori sufficiently probable because of their proximity to the observed landmark, estimated at $\hat{A}$; they are chosen on the basis of the condition :

$$(A_k - A)^T S^{-1} (A_k - A) \leq \gamma \qquad (3)$$

where the constant $\gamma$ allows the probability selected for the association of $A_k$ and $\hat{A}$ to be adjusted.

The computing unit 11, connected to computing unit 10, determines the probabilities $\beta_k$ of associating the detected landmark with the landmarks referenced at Ak and the probability $\beta_o$ that the detected landmark is none of the selected landmarks; such determination is carried out in accordance with the conventional PDAF technique, on the basis of the prediction information of filter 16 and measurement of the position of the detected landmark (computing means 2), after processing in the computing units 13 and 10.

$$\beta_o = a_o \left[ a_o + \sum_{l=1}^{K} a_l \right]^{-1} \quad (4)$$

$$\beta_k = a_k \left[ a_o + \sum_{l=1}^{K} a_l \right]^{-1} \quad (5)$$

where $$a_o = \frac{K}{V} (2\pi |S|)^{\frac{1}{2}} \times \frac{1 - P_D P_G}{P_D} \quad (6)$$

$$a_k = \exp\left[ -\frac{1}{2} (A_k - A)^T S^{-1} (A_k - A) \right] \quad (7)$$

with

K : number of landmarks selected by (3),
V : volume of the assembly of points $A_k$ satisfying (3),
$P_D$ : probability of detection of a landmark,
$P_G$ : probability of having the detected landmark in V.

The computing unit 12, connected to the computing units 11 and 18, merges the masses of probability $m_L$ ($\theta_k = \beta_k$, attributed to the hypotheses $\theta_k$ of associating the detected landmark with the different landmarks $A_k$ by unit 11, with the masses $m_{RC}(U\theta_k)$ attributed to all the possible sets of hypotheses $\theta_k$ by unit 18, on the basis of the identification of the landmark. Such merging takes place according to the conventional inference rules of Dempster for supplying masses $m_{LRC}(\theta_k)$ to the hypotheses $\theta_k$ alone, to the exclusion of any set of such hypotheses (property related to the similar character of masses $m_L$) :

$$m_{LRC}(\theta_k) = \sum_{\substack{\theta \\ \theta_k \cap \theta \neq \phi}} m_L(\theta_k) \cdot m_{RC}(\theta)/(1-k) \quad (8)$$

where:

$$k = \sum_{\substack{\theta, \theta_k \\ \theta_k \cap \theta = \phi}} m_L(\theta_k) m_{RC}(\theta) \quad (9)$$

$\theta$ designating any possible combination of the hypotheses $\theta_k$.

The computing unit 14, connected to the computing unit 12, allows the innovation of the filter, A, to be evaluated according to the conventional PDAF technique, the probabilities $\beta_k$ of associating the detected landmark with the landmarks referenced at $A_k$ after the recognition information (unit 12) has been taken into account being given by the masses $m_{LRC}(\theta_k)$ $$A = \sum_{k=1}^{k} \beta_k (A_k - A)$$

The computing unit 15, connected to the unit 14, supplies the gain G of the standard Kalman filter 16 :

$$G = P H^T S^{-1} \quad (11)$$

as well as updating said filter by the innovation coming from unit 14, at the measurement time :

$$x = x + GA \quad (12)$$

$$P = \beta_o P + (1 - \beta_o) P^C + P \quad (13)$$

with :

$$P = G\left[ \left( \sum_{k=1}^{M} \beta_k AA^T \right) - AA^T \right] G^T \quad (14)$$

and $$P^c = (I - GH) P \quad (15)$$

x being the state estimated from the measurement and from the state x predicted by filter 16 and P being the covariance matrix of its error. Filter 16 ensures prediction of state x, of the covariance matrix P concerning its error, and of the measurement y, at the time of the next measurement, according to the conventional Kalman filtering technique:

$$x = \phi x + u \quad (16)$$

$$P = \phi P \phi^T + Q \quad (17)$$

$$y = Hx \quad (18)$$

where $\phi$ is the transition matrix of the system,
Q is the state noise covariance matrix,
u is the control applied to the missile.

Filter 16 also supplies the output P of the system, i.e. the prediction of state x at times, possibly intermediate, suitable for guidance or display, depending on the application envisaged.

The characteristic extraction means 3, associated with comparison device 5, carries out local processing at the level of each sensor, adapted to each of these sensors, for recognizing the observed landmark. In accordance with what has been described above, such processing delivers, for each sensor, a range of probabilities that this landmark has of being of a given (or unknown) type, and this for all the a priori indexed types. The bounds of each range are identified with the notions of support $S_j(I_i)$ and of plausibility $P_j(I_i)$ of the theory of evidence, relatively to each identity hypothesis $I_i$ and to each of the M sensors j.

The computing unit 17 connected to the comparison device 5 then uses the inference rules of the theory of evidence for synthesizing the information thus available about the identity of the observed landmark; for that, it may operate in two steps :

1. First of all it merges the information delivered by the different sensors 1 for the same identity hypothesis $I_i$. This leads it to working out N sets of parallel masses of probability (one for each the N possible identities $I_i$: i∈1,N ) ; each set of masses is formed of a mass $m_i(I_i)$ attributed to the identity hypothesis $I_i$, of a total uncertainty mass $m_i(E)$ attributed to the set E of possible identities, and a mass $m_i(\bar{I}_i)$ attributed to the refusal of the identity $I_i$, i.e. to the set of hypotheses of E to the exclusion of $I_i$. These masses are given by the procedure :

$$m_i(I_i) = \frac{1}{k_i} \left[ \prod_{j=1}^{M} P_j(I_i) - \prod_{j=1}^{M} (P_j(I_i) - S_j(I_i)) \right] \quad (19)$$

-continued $$m_i(I_i) = \frac{1}{k_i} \left[ \prod_{j=1}^{M} (1 - S_j(I_i)) - \prod_{j=1}^{M} (P_j(I_i) - S_j(I_i)) \right] \quad (20)$$

$$m_i(E) = \frac{1}{k_i} \left[ \prod_{j=1}^{M} (P_j(I_i) - S_j(I_i)) \right] \quad (21)$$

with:

$$K_i = \prod_{j=1}^{M} P_j(I_i) + \prod_{j=1}^{M} (1 - S_j(I_i)) - \prod_{j=1}^{M} (P_j(I_i) - S_j(I_i)) \quad (22)$$

2. It then merges these N sets of masses $m_i$ in a form proper to the number N of possible identities, and established previously in accordance with the general formulation of Dempster's inference rules, with a view to obtaining a single set of masses $m_R$:

$$m_R(B) = \sum_{A_1, A_2 \ldots A_N} \prod_{i=1}^{N} m_i(A_i)/(1 - \Gamma) \quad (23)$$

$$A_1 \cap A_2 \cap \ldots \cap A_N = B \neq \phi$$

with $$\Gamma = \sum_{A_1, A_2, \ldots A_N} \prod_{i=1}^{N} m_i(A_i) \quad (24)$$

$$A_1 \cap A_2 \cap \ldots \cap A_N = \phi$$

It will be noted that a set of hypotheses $A_i$ designates:
either $(I_i)$
or $E = (I_i, I_2, \ldots I_N)$
or $E, \text{ovs}/I/_{i=E-(I_i)} = (I_i, \ldots, I_{i-1} I_{i+1}, I_N)$
and that B may designate any one of the $2^N - 1$ sub sets of E, i.e. all the possible combinations $U_iI_i$ of identity hypotheses $I_i$.

This computing unit 17 has then a logic function of managing the conjunctions, and a function of computing the masses.

The computing unit 18, connected to computing units 10 and 17, works out the masses $m_{RC}(U\theta_k)$ which it is suitable to attribute to the different possible sets of hypotheses $\theta_k$ of associating the observed landmark with the landmarks $A_k$ selected by unit 10, with a view to their being taken into account by the merging unit 12. The association hypotheses $\theta_k$ are evaluated on the basis of the set of masses $m_R$, worked out by unit 17, which described the identity of the observed landmark and on the basis of sets of masses $m_c^k$ which describe, by previous processing of the data in memory 6 similar to that of unit 17, the identity of each of the candidate landmarks $A_k$. The combinatory (logic) and calculatory realization of unit 18 corresponds to the general formulation:

$$m_{RC}(U\theta_k) = \sum_{k \in N_k} m_R(A) \times \quad (25)$$

$$\prod_{k \in N_k} \left[ \sum_{\substack{B \\ B \cap A \neq \phi}} m_c^k(B) \right] \times \prod_{k \in N_k} \left[ \sum_{\substack{B \\ B \cap A = \phi}} m_c^k(B) \right]$$

where
A and B designate any sub sets of E, i.e. of any combinations of identity hypotheses $I_i$,
$N_k$ represents the set of indices of the landmarks concerned by the computation carried out.

It can be seen that the system according to the invention allows
recognition alone of particular landmarks in the landscape and their type among a few types a priori indexed to be taken into account;
processing of the ambiguities as to identity and location of the landmarks, due to the simplicity level of the information taken into account;
the circumstantial taking into account of the uncertainty possibly related to methods used for characterizing objects by imagery;
the appropriate use of several imagery sensors simultaneously;
the possibility of not requiring the information from the inertial unit, depending on a judicious choice of the landmarks and the sensors (density of the different types of landmark appropriate for continuous resetting of the filter, conjointly with permanent lifting of ambiguities).

From these particular features numerous advantages are obtained with respect to existing systems:

1. At the level of preparation of the mission of the aircraft:
learning of the data related to the ground is easier and simpler; the information is easier to obtain because it is more synthetic, and requires much less previous processing;
planning and the possible change of missions can be carried out with much more flexibility, taking into account the learning required and the structure of the system (memory 6 is simple to change and it is the only one to be modified).

2. At the level of operation in flight:
the mass of computations required is smaller the independence of the system with respect to the sensors used is much greater.

3. At the level of the operational performances:
robustness of the system with respect to the ground flown over and the flight conditions is greater,
the quantity, quality and frequency needs of the information are less exigent,
the possibilities of geographical coverage of the system are more extensive, in connection with the facilities introduced above.

As was mentioned above, the system of the invention can be used on board a pilotless vehicle (missile, drone, ...) or on board an aircraft.

On board a pilotless vehicle 20, its implantation may be that of FIG. 3: the sensors 1 feed the system 2 to 8 described above which supplies to a guidance module the state of the vehicle (position, speed, available at output P. The guidance module 21, taking into account the purpose of the mission, works out the trajectory to be followed, which it communicates to a piloting module 22 which then works out the orders to send to the members 23 controlling the control surfaces 24 of the missile, so as to slave it to the nominal trajectory defined by the guidance module 21.

In the case of implantation on board an aircraft, the output of system 2 to 8 described may be fed to a display unit (not shown) available to the pilot or navigator.

What is claimed is:

1. In an airborne system for determining the position of an aerial vehicle, of the type comprising sensitive means scanning the ground flown over, Kalman filter means, storage means containing the map of the ground to be flown over, means for comparison between the information delivered by said sensitive means and information from said storage means, as well as computing means delivering error information to said Kalman filter means, the improvement wherein:

said storage means comprises a first memory containing the general characteristics of different types of discrete landmarks and a second memory containing the geographical position of such landmarks on the ground to be flown over; and said system further comprises:

a device for extracting, from the signals delivered by said sensitive means, said general characteristics of said different types of discrete landmarks located on the ground being flown over; and a device for computing, from the signals delivered by said sensitive means, the relative positions of said vehicle with respect to said recognized landmarks, which is sends to said Kalman filter means;

said comparison means comprising a first comparison device comparing the information from said extraction device with that contained in said first memory, as well as a second comparison device comparing the information from said first comparison device with that contained in said second memory.

2. The system as claimed in claim 1, wherein:

said computing means computes, for the information from said first comparison device, the probability for each landmark recognized by said sensitive means to belong to each of said types of landmarks;

said second memory comprises for each landmark described by its geographical position the probability for said landmark to be each of said types of landmarks; and said second comparison device compares, for each of the landmarks contained in said second memory, the probabilities of being each of said types of landmarks with the similar probabilities delivered by said first comparison device for a landmark recognized by said sensitive means.

3. The system as claimed in claim 2, wherein said sensitive means comprise a plurality of different sensors.

4. The system as claimed in claim 2, wherein said second comparison device infers said probabilities following the rules drawn from Dempster and Shafer's theory of evidence.

5. The system as claimed in claim 2, wherein determination of said error information by said computing means is implemented by Bar Shalom's PDAF technique.

6. The system as claimed in claim 2, comprising :

a first computing unit, connected to said device computing the relative positions of the vehicle with respect to the recognized landmarks and to the Kalman filter properly speaking, estimating the absolute position of an observed landmark, as well as the covariance matrix of the innovation regarding the position of the observed landmark;

a second computing unit, connected to said second memory and to said first computing unit, providing statistical fenestration of the landmarks of said second memory;

a third computing unit, connected to said second computing unit, determining the probability of associating the detected landmark with the landmarks of said second memory, according to the PDAF technique;

a fourth computing unit, connected to the first comparison device, putting into practice the rules of inference of the theory of evidence for synthesizing the information available concerning the identity of the observed landmark;

a fifth computing unit, connected to the second and fourth computing units, working out the masses to be attributed to the different possible sets of hypotheses of associating the observed landmark with the landmarks of the second memory selected by the second computing unit;

a sixth computing unit, connected to said third and fifth computing units, merging the masses of probabilities attributed to the hypotheses of associating the detected landmark with the different landmarks of the second memory by said third computing unit with the masses attributed to all the possible sets of hypotheses by said fifth computing unit;

a seventh computing unit, connected to said sixth computing unit and evaluating the innovation of the Kalman filter using the PDAF technique; and an eighth computing unit, connected to said seventh computing unit and supplying the gain to the Kalman filter and up-dating same.

7. A navigational aid system for an aerial vehicle, comprising the system specified under claim 1 and display device on which the output signals of the Kalman filter are displayed.

8. Automatic guidance system for an aerial vehicle, comprising the system specified under claim 1 and devices using the output signals from the Kalman filter for acting on the members controlling steering of said vehicle.

* * * * *